United States Patent
Kim et al.

(10) Patent No.: US 7,826,571 B2
(45) Date of Patent: Nov. 2, 2010

(54) METHOD AND APPARATUS FOR DETECTING SIGNAL IN A MIMO COMMUNICATION SYSTEM

(75) Inventors: Jae-Kwon Kim, Jeollanam-do (KR);
Yung-Soo Kim, Seongnam-si (KR);
Cheol-Woo You, Seoul (KR);
Sung-Kwon Hong, Seoul (KR);
Mazzarese David, Suwon-si (KR);
Soong-Yoon Choi, Suwon-si (KR);
Gun-Chul Hwang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1061 days.

(21) Appl. No.: 11/543,387

(22) Filed: Oct. 5, 2006

(65) Prior Publication Data

US 2007/0086549 A1 Apr. 19, 2007

(30) Foreign Application Priority Data

Oct. 7, 2005 (KR) .................. 10-2005-0094442

(51) Int. Cl.
*H04L 1/02* (2006.01)
(52) U.S. Cl. ....................... 375/347; 375/267
(58) Field of Classification Search ............... 375/347, 375/267, 340, 341, 260
See application file for complete search history.

(56) References Cited

U.S. PATENT DOCUMENTS

| 6,307,851 | B1 * | 10/2001 | Jung et al. | 370/342 |
| 2004/0076248 | A1 * | 4/2004 | Purho | 375/350 |
| 2004/0146117 | A1 * | 7/2004 | Subramaniam et al. | 375/260 |

(Continued)

FOREIGN PATENT DOCUMENTS

KR 1020040079410 9/2004

(Continued)

OTHER PUBLICATIONS

Ryota Kimura, Ryuhei Funada, Hiroshi Harada, and Shigeru Shimamoto,"Multiple-QR-Decomposition Assisted Group Detection for Reduced-Complexity-and-Latency MIMO-OFDM Receivers", Waseda University, Tokyo, Japan, 2006, IEEE.*

(Continued)

*Primary Examiner*—Chieh M Fan
*Assistant Examiner*—Aristocratis Fotakis
(74) *Attorney, Agent, or Firm*—The Farrell Law Firm, LLP

(57) ABSTRACT

Detection of a signal in a receiver of a MIMO communication system includes a transmitter for signals transmission via K antennas and a receiver for receiving the signals via L reception antennas, such that L is greater than or equal to K and the system has a K×L-dimensional channel matrix, by converting the channel matrix into a plurality of matrixes having an upper triangle structure; dividing each of the matrixes into at least two sub-matrixes having a dimension lower than that of the channel matrix; detecting transmission symbols from corresponding antennas through decoding of a) lowest sub-matrix signal received which sub-matrix is constituted of components having only the channel characteristics of two antennas among the two sub-matrixes; and b) an upper sub-matrix signal using the transmission symbols; and outputting all of the detected transmission symbols, if transmission symbols by a highest sub-matrix among at least two sub-matrixes are detected.

14 Claims, 2 Drawing Sheets

U.S. PATENT DOCUMENTS

| | | | |
|---|---|---|---|
| 2005/0078665 | A1 | 4/2005 | Yu et al. |
| 2005/0078761 | A1 | 4/2005 | Hottinen et al. |
| 2005/0157806 | A1 | 7/2005 | Walton et al. |
| 2009/0034664 | A1* | 2/2009 | Masui et al. ............... 375/341 |
| 2009/0052513 | A1* | 2/2009 | Heikkila .................. 375/230 |
| 2009/0103641 | A1* | 4/2009 | Masui et al. ............... 375/260 |
| 2009/0154608 | A1* | 6/2009 | Yoon et al. ................ 375/341 |

FOREIGN PATENT DOCUMENTS

| | | | |
|---|---|---|---|
| KR | 1020050034476 | | 4/2005 |
| SE | 1 564 908 | * | 8/2005 |

OTHER PUBLICATIONS

Yi Jiang, Jian Li, William Hager, "MIMO Transceiver Design Using Geometric Mean Decomposition", 2004 IEEE.*

Zhang et al., On Low Complexity ML Detection Algorithm in MIMO System, 2005 Vehicular Technology Conference, May 30, 2005.

Choi, On the Partial Map Detection With Applications to MIMO Channels, IEEE Transactions on Signal Processing, Jan. 2005.

Wang et al., Reduced-Complexity Sphere Decoding Via Detection Ordering for Linear Multi-Input Multi-Output Channels, 2004 Signal Processing Systems, Oct. 13, 2004.

He et al., Reduced-Complexity Maximum Likelihood Detection for V-Blast Systems, 2003 IEEE Military Communications Conference, Oct. 13, 2003.

Fukatani et al., Two Methods for Decreasing the Computational Complexity of the MIMO ML Decoder, IEICE Transactions on Fundamentals of Electronics, Communications and Computer Sciences, Oct. 2004.

* cited by examiner

METHOD AND APPARATUS FOR DETECTING SIGNAL IN A MIMO COMMUNICATION SYSTEM

PRIORITY

This application claims the benefit under 35 U.S.C. §119 of an application entitled "Method and Apparatus for Detecting Signal in a MIMO Communication System" filed in the Korean Intellectual Property Office on Oct. 7, 2005 and assigned Serial No. 2005-94442, the entire contents of which is incorporated herein by reference.

BACKGROUND OF THE INVENTION

1. Field of the Invention

The present invention relates generally to a wireless communication system, and in particular, to a method and apparatus for detecting signals in a Multiple-Input Multiple-Output (MIMO) communication system.

2. Description of the Related Art

With the rapid growth of the wireless communication market, there is an increasing demand for various multimedia services in the wireless environment. There is an increasing trend in the capacity and rate of the transmission data. It is very important to find a method capable of efficiently using the limited frequencies, Thus a need for a new multi-antenna transmission technique is required.

In $3^{rd}$ Generation Partnership Project (3GPP) which is a group standard for the $3^{rd}$ generation mobile communication, intensive search is being conducted on a Multiple-Input Multiple-Output (MIMO) system capable of supporting high data rate. In addition, new data transmission schemes to which a multi-antenna signal processing technique is applied are now under active discussion in the MIMO system (environment).

The MIMO system needs an efficient signal processing algorithm not only for the high quality but also for the high rate of data service. The signal processing algorithm can be divided into a signal processing algorithm at a transmitter and its associated signal processing algorithm at a receiver. The signal processing algorithm at the transmitter is a scheme for transmitting high-quality data at a high data rate, and the signal processing algorithm at the receiver is a scheme for detecting the high-quality data transmitted at the high rate.

The Bell Labs Layered Space Time (BLAST) technique is the typical signal processing algorithm at the transmitter. The BLAST technique, as it uses multiple antennas, can increase data throughput without increasing the frequency domain used by the system.

The BLAST technique is divided into Diagonal-BLAST (D-BLAST) and Vertical-BLAST (V-BLAST). The D-BLAST has a high frequency efficiency, because it uses specific block coding for the data transmitted at each transmission antenna for diagonal transmission. However, high implementation complexity associated with D-BLAST is a disadvantage. Compared with D-BLAST, V-BLAST can reduce the complexity, as it transmits data independently at each antenna.

The signal processing algorithm at the receiver, an algorithm used for detecting the signals transmitted at each transmission antenna using a received signal, can be classified into a linear detection technique and a non-linear detection technique.

The linear detection technique is classified into a Zero Forcing (ZF) technique and a Minimum Mean Square Error (MMSE) technique.

The ZF technique is for detecting symbols starting from the symbol corresponding to the column vector having the largest vector size by calculating a criterion for each column vector of a channel matrix, and then removing the detected signal component from the received signal, thereby deleting inter-symbol interference. The MMSE technique is for minimizing a mean square error between the originally transmitted symbols and the signals estimated at the receiver.

The non-linear technique is classified into a Maximum Likelihood detection (ML) technique and a Successive Interference Cancellation (SIC) technique.

The ML technique can noticeably improve performance by substituting all symbols transmittable at all transmission antennas and selecting an input having the minimum Squared Euclidean Distance. However, its complexity increases exponentially with the number of transmission antennas and the modulation order. Therefore, the ML technique, although it exhibits the best performance, is disadvantageous in that it has high implementation complexity due to an increase in the calculation.

The SIC technique is a noise canceling technique for preferentially detecting and deleting the channel having a high Signal-to-Interference plus Noise Ratio (SINR), thereby increasing the performance. For the SIC technique, ordering for obtaining the best performance is separately required.

For the performance improvement of the MIMO system, there is a demand for a signal detection technique that can correctly detect a transmission signal from a received signal and is superior in terms of the amount of calculation.

SUMMARY OF THE INVENTION

To solve at least the above problems and/or disadvantages and to provide at least the advantages below, the present invention provides a signal detection method capable of improving decoding performance and reducing calculation for decoding in a MIMO system.

The present invention further provides a signal detection method and apparatus for converting a channel matrix into a matrix having an upper triangle structure and detecting a transmission symbol using a sub-matrix separated from the converted matrix in a MIMO system.

According to one aspect of the present invention, there is provided a method for detecting a signal in a receiver of a Multiple-Input Multiple-Output (MIMO) communication system including a transmitter for transmitting signals via K transmission antennas and a receiver for receiving the signals via L reception antennas, wherein L is greater than or equal to K and the system has a K×L-dimensional channel matrix. The method includes converting the channel matrix into a plurality of matrixes having an upper triangle structure; dividing each of the matrixes into at least two sub-matrixes having a dimension lower than that of the channel matrix; detecting transmission symbols from corresponding transmission antennas through decoding on a signal received according to a lowest sub-matrix comprised of components having only the channel characteristics for two transmission antennas among at least two sub-matrixes; detecting transmission symbols from corresponding transmission antennas through decoding on a signal received according to an upper sub-matrix, using the transmission symbols; and outputting all of the detected transmission symbols, if transmission symbols by a highest sub-matrix among at least two sub-matrixes are detected.

According to another aspect of the present invention, there is provided an apparatus for detecting a signal in a receiver of a Multiple-Input Multiple-Output (MIMO) communication system having a K×L-dimensional channel matrix. The apparatus includes L reception antennas for receiving signals transmitted from a transmitter via K transmission antennas, and a decoder for detecting transmission symbols from the received signals provided from the reception antennas. The decoder includes converting the channel matrix into a plurality of matrixes having an upper triangle structure; dividing each of the matrixes into at least two sub-matrixes having a dimension lower than that of the channel matrix; detecting transmission symbols from corresponding transmission antennas through decoding on a signal received according to a lowest sub-matrix comprised of components having only the channel characteristics for two transmission antennas among the at least two sub-matrixes; detecting transmission symbols from corresponding transmission antennas through decoding on a signal received according to an upper sub-matrix, using the transmission symbols; and outputting all of the detected transmission symbols, if transmission symbols by a highest sub-matrix among the at least two sub-matrixes are detected.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Several preferred embodiments of the present invention will now be described in detail with reference to the annexed drawings. A detailed description of known functions and configurations incorporated herein has been omitted for clarity and conciseness.

The present invention provides a signal detection method and apparatus suitable for a Multiple-Input Multiple-Output (MIMO) communication system that includes a transmitter for transmitting signals via K transmission antennas, and a receiver for receiving the signals via L reception antennas (where L≧K). Here, the MIMO communication system has a K×L-dimensional channel matrix.

For the signal detection technique proposed by the present invention, there is a need for the capability of expressing a channel transfer matrix with a plurality of matrixes having an upper triangle structure. The signal detection technique detects transmission symbols by dividing each of the matrixes into at least two sub-matrixes having a dimension lower than that of the channel matrix, and decoding a received signal expressed by the lowest sub-matrix among the two sub-matrixes. Here, the lowest sub-matrix is composed of the components having only the channel characteristic corresponding to two transmission antennas.

Thereafter, in the process of decoding the received signal expressed by an upper sub-matrix of the lowest sub-matrix, the remaining transmission symbols are detected using the previously detected transmission symbols.

With reference to the accompanying drawings, a detailed description will now be made of a signal detection method and apparatus according to the present invention.

Figure 1:
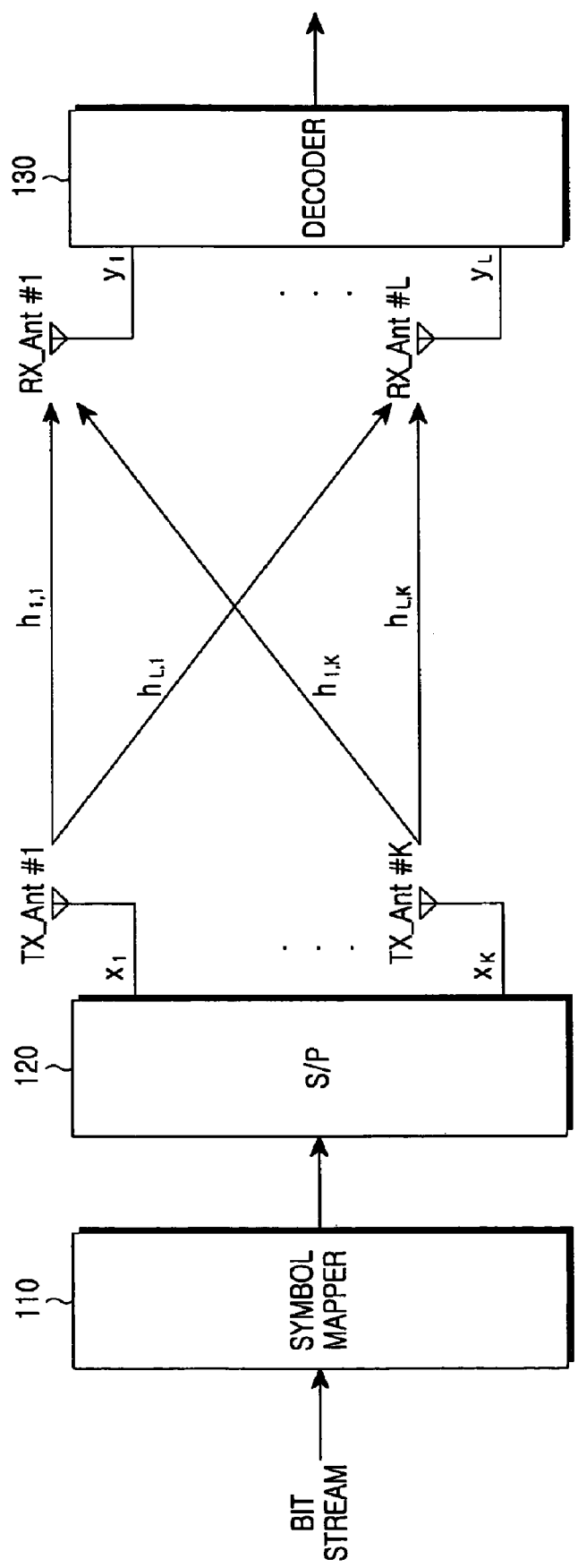
FIG. 1 is a diagram illustrating a MIMO system with K transmission antennas and L reception antennas, to which the present invention is applied.

FIG. 1 is a diagram illustrating a MIMO system with K transmission antennas and L reception antennas, to which the present invention is applied. Here, the number L of reception antennas can be greater than or equal to the number K of transmission antennas.

Referring to FIG. 1, a symbol mapper 110 performs symbol mapping on the bits of an input bit stream according to a modulation scheme. The modulation scheme includes not only 16-ary Quadrature Amplitude Modulation (16QAM) and 64QAM but also Orthogonal Frequency Division Multiplexing (OFDM) modulation. A serial-to-parallel (S/P) converter 120 receives the serial symbol stream from the symbol mapper 110, and outputs parallel symbol streams $x_1, \ldots, x_K$, the number of which is equal to the number of transmission antennas. The symbol streams, i.e. transmission signals, output from the S/P converter 120 are transmitted via corresponding transmission antennas TX_Ant#1 to TX_Ant#K.

The transmission signals from the transmission antennas are received at reception antennas RX_Ant#1 to RX_Ant#L over a wireless channel. The received signals $y_1, \ldots, y_K$ from the reception antennas are input to a decoder 130. The decoder 130 detects the transmission signals from the received signals.

A detailed description will now be made of a new signal detection method for detecting a transmission signal from a received signal according to the present invention. It is assumed herein that K transmission antennas and L reception antennas are used.

A received signal in the MIMO system can be expressed as a matrix defined by Equation (1).

$$y = H_x + n \quad (1)$$

where a received signal matrix y is $y=[y_1, y_2, \ldots, y_L]$, H is a channel transfer matrix indicating a channel characteristic between transmission antennas and reception antennas, a transmission signal matrix x is $x=[x_1, x_2, \ldots, x_K]$, and $n\, (=[n_1, n_2, \ldots, n_L])$ is an additive white Gaussian noise (AWGN) matrix input to each reception antenna.

The channel transfer matrix H is expressed as an L×K matrix defined by Equation (2).

$$H = \begin{bmatrix} h_{1,1} & \cdots & h_{1,K} \\ \vdots & \ddots & \vdots \\ h_{L,1} & \cdots & h_{L,K} \end{bmatrix} \quad (2)$$

where $h_{l,k}$ (k=1, ..., K, and l=1, ..., L) denotes the number of complex flat fading channels from a $k^{th}$ transmission antenna to an $l^{th}$ reception antenna.

From the foregoing definitions, the matrix of Equation (1) can be expressed as Equation (3).

$$\begin{bmatrix} y_1 \\ y_2 \\ \vdots \\ y_L \end{bmatrix} = \begin{bmatrix} h_{11} & h_{12} & \cdots & h_{1K} \\ h_{21} & h_{22} & \cdots & h_{2K} \\ \vdots & & \ddots & \vdots \\ h_{L1} & h_{L2} & \cdots & h_{LK} \end{bmatrix} \begin{bmatrix} x_1 \\ x_2 \\ \vdots \\ x_K \end{bmatrix} + \begin{bmatrix} n_1 \\ n_2 \\ \vdots \\ n_L \end{bmatrix} \quad (3)$$

In order to detect the received signal in the present invention, Equation (1) can be developed as Equation (4) using a common QRP composition scheme.

$$y = Hx + n = QRP_x + n \quad (4)$$

That is, the channel transfer matrix H can be expressed with a QRP matrix by the QRP composition scheme, where P denotes a permutation matrix.

The right side of Equation (4) is multiplied by a previously known unimodular matrix T and its inverse matrix $T^{-1}$, and the result is shown in Equation (5). QRP composition scheme is a technique for converting H matrix into matrixes having an upper triangle structure. Q, R and P matrixes generated by QRP composition are matrixes which can generate H matrix by matrix multiplication.

$$y = QRTT^{-1}P_x + n \quad (5)$$

The matrixes used in Equation (5) can be defined as $$\tilde{y} = Q^H y$$

$$\tilde{R} = RT$$

$$\tilde{x} = T^{-1}P_x$$

$$\tilde{n} = Q^H n \quad (6)$$

where $Q^H$ is a Hermitian matrix of Q. $\tilde{R}$ is derived from the QRP matrix which is well known in the art.

Equation (7) can be obtained by applying the definition of Equation (6) to Equation (5).

$$\tilde{y} = \tilde{R}\tilde{x} + \tilde{n} \quad (7)$$

In order to develop Equation (5) into Equation (7), it is assumed that both sides of Equation (5) are multiplied by $Q^H$. This is to cancel Q existing in the right side of Equation (5).

If $\tilde{x} = T^{-1}Px$ is considered in Equation (7), Equation (7) can be expressed as Equation (8).

$$\tilde{y} = \tilde{R}T^{-1}P_x + \tilde{n} \quad (8)$$

In Equation (8), $\tilde{R}$ and $T^{-1}$ have an upper triangle structure. The upper triangle structure means a structure where all lower components have a value of '0' on the basis of a diagonal of the matrix. For example, $\tilde{R}$ can be represented by Equation (9), and $T^{-1}$ can be represented by Equation (10).

$$\begin{bmatrix} r_{11} & r_{12} & r_{13} & r_{14} & \cdots & r_{1K} \\ 0 & r_{22} & r_{23} & r_{24} & \cdots & r_{2K} \\ 0 & 0 & r_{33} & r_{34} & \cdots & r_{3K} \\ 0 & 0 & 0 & r_{44} & \cdots & r_{4K} \\ \vdots & & & & \ddots & \vdots \\ 0 & 0 & 0 & 0 & \cdots & r_{LK} \end{bmatrix} \quad (9)$$

$$\begin{bmatrix} t_{11} & t_{12} & t_{13} & t_{14} & \cdots & t_{1K} \\ 0 & t_{22} & t_{23} & t_{24} & \cdots & t_{2K} \\ 0 & 0 & t_{33} & t_{34} & \cdots & t_{3K} \\ 0 & 0 & 0 & t_{44} & \cdots & t_{4K} \\ \vdots & & & & \ddots & \vdots \\ 0 & 0 & 0 & 0 & \cdots & t_{LK} \end{bmatrix} \quad (10)$$

r is an element of $\tilde{R}$ matrix, and t is an element of $T^{-1}$

Based on this, the present invention provides a new signal detection technique detects the remaining K/n transmission signals by applying the detected transmission signals to Equation (8). Here, the received signal pair for previously detecting transmission signals corresponds to a lower received signal pair among n received signal pairs. The number, n, of the received signal pairs is determined according to the performance required in the MIMO system.

In the foregoing example, it is assumed that the received signals are divided into n received signal pairs. However, the new signal detection technique divides the received signals into n signal groups by grouping them in pairs, and performs signal detection on the signal groups from the lowest received signal group to the highest received signal group. Here, in the process of detecting transmission signals depending on the upper received signal group, the technique takes into account the transmission signals detected by the lower received signal group of the current received signal group.

For example, when grouping is performed in units of two received signals, the technique performs signal detection on the received signals from the received signals $(y_{L-1}, y_L)$ belonging to the lowest received signal group to the received signals $(y_1, y_2)$ belonging to the highest received signal group. Therefore, in detecting the received signals $(y_{l-1}, y_l)$ belonging to an arbitrary received signal group, the technique can use the transmission signals detected for the received signals $(y_{l+1}, \ldots, y_L)$ belonging to the lower received signal group.

A description will now be made of the signal detection method of the present invention, assuming that the MIMO system has 4 transmission antennas and 4 reception antennas.

Under the above assumption, a received signal defined by Equation (8) can be expressed as $$\begin{bmatrix} y_1 \\ y_2 \\ y_3 \\ y_4 \end{bmatrix} = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} t_{11} & t_{12} & t_{13} & t_{14} \\ 0 & t_{22} & t_{23} & t_{24} \\ 0 & 0 & t_{33} & t_{34} \\ 0 & 0 & 0 & t_{44} \end{bmatrix} P \begin{bmatrix} x_1 \\ x_2 \\ x_3 \\ x_4 \end{bmatrix} + \text{noise} \quad (11)$$

It can be understood from Equation (11) that $\tilde{R}$ and $T^{-1}$ have an upper triangle structure. Therefore, the signal detection method divides 4 received signals $y_1, y_2, y_3, y_4$ into two received signal pairs (or groups the 4 received signals in pairs). That is, the signal detection method can divide the 4 received signals into two lower systems. The division into lower systems can be achieved by various methods proposed above. In the following description, it will be assumed that the received signals are grouped two by two.

Under this assumption, Equation (12) below corresponds to a lower system separated from Equation (11) according to the received signals $y_3$ and $y_4$, and Equation (13) below corresponds to a lower system separated from Equation (11) according to the received signals $y_1$ and $y_2$.

$$\begin{bmatrix} y_3 \\ y_4 \end{bmatrix} = \begin{bmatrix} r_{33} & r_{34} \\ 0 & r_{44} \end{bmatrix} \begin{bmatrix} t_{33} & t_{34} \\ 0 & t_{44} \end{bmatrix} \begin{bmatrix} x_3 \\ x_4 \end{bmatrix} + \text{noise} \quad (12)$$

$$= \begin{bmatrix} r_{33} & r_{34} \\ 0 & r_{44} \end{bmatrix} \begin{bmatrix} t_{33}x_3 + t_{34}x_4 \\ t_{44}x_4 \end{bmatrix} + \text{noise}$$

$$\begin{bmatrix} y_1 \\ y_2 \end{bmatrix} = \begin{bmatrix} r_{11} & r_{12} & r_{13} & r_{14} \\ 0 & r_{22} & r_{23} & r_{24} \end{bmatrix} \begin{bmatrix} t_{11} & t_{12} & t_{13} & t_{14} \\ 0 & t_{22} & t_{23} & t_{24} \\ 0 & 0 & t_{33} & t_{34} \\ 0 & 0 & 0 & t_{44} \end{bmatrix} \begin{bmatrix} x_1 \\ x_2 \\ x_3 \\ x_4 \end{bmatrix} + \text{noise} \quad (13)$$

In Equation (12) and Equation (13), $$\begin{bmatrix} r_{33} & r_{34} \\ 0 & r_{44} \end{bmatrix} \text{ and } \begin{bmatrix} r_{11} & r_{12} & r_{13} & r_{14} \\ 0 & r_{22} & r_{23} & r_{24} \end{bmatrix}$$

are sub-matrixes of $\tilde{R}$, and $$\begin{bmatrix} t_{33} & t_{34} \\ 0 & t_{44} \end{bmatrix}$$

is a sub-matrix of $T^{-1}$.

The signal detection method of the present invention detects transmission signals, i.e. transmission symbols $x_3$ and $x_4$, using Equation (12), and detects the detected $x_3$ and $x_4$ and the remaining transmission symbols $x_1$ and $x_2$ using Equation (13).

A description will now be made of the operation of detecting the transmission symbols $x_3$ and $x_4$ using Equation (12).

Equation (12) can be developed into $$\begin{bmatrix} y_3 \\ y_4 \end{bmatrix} = \begin{bmatrix} r_{33} & r_{34} \\ 0 & r_{44} \end{bmatrix} \begin{bmatrix} t_{33} & t_{34} \\ 0 & t_{44} \end{bmatrix} \begin{bmatrix} x_3 \\ x_4 \end{bmatrix} + \text{noise} \quad (14)$$

$$= \begin{bmatrix} r_{33} & r_{34} \\ 0 & r_{44} \end{bmatrix} \begin{bmatrix} t_{33}x_3 + t_{34}x_4 \\ t_{44}x_4 \end{bmatrix} + \text{noise}$$

where $$\begin{bmatrix} r_{33} & r_{34} \\ 0 & r_{44} \end{bmatrix}$$

is a sub-matrix of $\tilde{R}$, and $$\begin{bmatrix} t_{33} & t_{34} \\ 0 & t_{44} \end{bmatrix}$$

is a sub-matrix of $T^{-1}$.

In Equation (14), because the sub-matrix of $\tilde{R}$, the sub-matrix of $T^{-1}$, and $$\begin{bmatrix} y_3 \\ y_4 \end{bmatrix}$$

are known values, the transmission symbols $x_3$ and $x_4$ can be calculated using the existing signal detection technique or Modified ML (MML) technique. The MML technique, if it detects one of the transmission symbols $x_3$ and $x_4$, can detect the remaining one transmission symbol. For example, when the MML technique detected $x_3$, it can simply calculate the $x_4$ by substituting the detected $x_3$ in a generalized formula.

Next, a description will be made of an operation of detecting the transmission symbols $x_1$ and $x_2$ using Equation (13).

In order to reduce the complexity, the right side of Equation (13) can be divided into one term composed of the previously calculated transmission symbols $x_3$ and $x_4$, and another term composed of the remaining transmission symbols $x_1$ and $x_2$, as shown in Equation (15) below.

$$\begin{bmatrix} y_1 \\ y_2 \end{bmatrix} = \begin{bmatrix} r_{11} & r_{12} & r_{13} & r_{14} \\ 0 & r_{22} & r_{23} & r_{24} \end{bmatrix} \begin{bmatrix} t_{11} & t_{12} & t_{13} & t_{14} \\ 0 & t_{22} & t_{23} & t_{24} \\ 0 & 0 & t_{33} & t_{34} \\ 0 & 0 & 0 & t_{44} \end{bmatrix} \begin{bmatrix} x_1 \\ x_2 \\ x_3 \\ x_4 \end{bmatrix} + \text{noise} \quad (15)$$

$$= \begin{bmatrix} r_{11} & r_{12} & r_{13} & r_{14} \\ 0 & r_{22} & r_{23} & r_{24} \end{bmatrix} \left( \begin{bmatrix} t_{11} & t_{12} \\ 0 & t_{22} \\ 0 & 0 \\ 0 & 0 \end{bmatrix} \begin{bmatrix} x_1 \\ x_2 \end{bmatrix} + \begin{bmatrix} t_{13} & t_{14} \\ t_{23} & t_{24} \\ t_{33} & t_{34} \\ 0 & t_{44} \end{bmatrix} \begin{bmatrix} x_3 \\ x_4 \end{bmatrix} \right) + \text{noise}$$

$$= \begin{bmatrix} r_{11} & r_{12} \\ 0 & r_{22} \end{bmatrix} \begin{bmatrix} t_{11} & t_{12} \\ 0 & t_{22} \end{bmatrix} \begin{bmatrix} x_1 \\ x_2 \end{bmatrix} +$$

$$\begin{bmatrix} r_{11} & r_{12} & r_{13} & r_{14} \\ 0 & r_{22} & r_{23} & r_{24} \end{bmatrix} \begin{bmatrix} t_{13} & t_{14} \\ t_{23} & t_{24} \\ t_{33} & t_{34} \\ 0 & t_{44} \end{bmatrix} \begin{bmatrix} x_3 \\ x_4 \end{bmatrix} + \text{noise}$$

$$= \begin{bmatrix} r_{11} & r_{12} \\ 0 & r_{22} \end{bmatrix} \begin{bmatrix} t_{11} & t_{12} \\ 0 & t_{22} \end{bmatrix} \begin{bmatrix} x_1 \\ x_2 \end{bmatrix} + I(x_3, x_4) + \text{noise}$$

where $$\begin{bmatrix} r_{11} & r_{12} \\ 0 & r_{22} \end{bmatrix}$$

is a sub-matrix of $\tilde{R}$, and $$\begin{bmatrix} t_{11} & t_{12} \\ 0 & t_{22} \end{bmatrix}$$

is a sub-matrix of $T^{-1}$.

In Equation (15), $I(x_3,x_4)$ is the previously calculated value, and the sub-matrix of $\tilde{R}$ and the sub-matrix of $T^{-1}$ are the known values. Therefore, in Equation (15), for the term composed of the transmission symbols $x_1$ and $x_2$, the transmission symbols $x_1$ and $x_2$ can be calculated using the existing signal detection technique or MML technique. As described above, if the MML technique detects one of the transmission symbols $x_1$ and $x_2$, it can detect the remaining one transmission symbol.

The MML technique borrowed in the present invention can be defined as $$x_j = \arg\min_{x_j} \left\| y - \sum_{i \in \Pi\{j\}} h_i x_{i,ML} - h_j x_j \right\| \quad (16)$$

$$\stackrel{a}{=} \arg\min_{x_j} \left\| \frac{h_j^H}{\|h_j\|^2} \left( y - \sum_{i \in \Pi\{j\}} h_i x_{i,ML} \right) - x_j \right\|$$

-continued $$\hat{b} = Q\left(\frac{h_j^H}{\|h_j\|^2}\left(y - \sum_{i \in n\{j\}} h_i x_{i,ML}\right)\right)$$

where $x_j$ denotes a transmission symbol desired to be detected, and i denotes an index of the remaining transmission symbol except for an index j of the transmission symbol to be detected among the indexes I of the transmission symbols. For example, if it is assumed that the method desires to detect the $x_4$ after previously detecting the $x_3$ from the $x_3$ and $x_4$, then $x_j$ is $x_4$ and i is 3.

Figure 2:
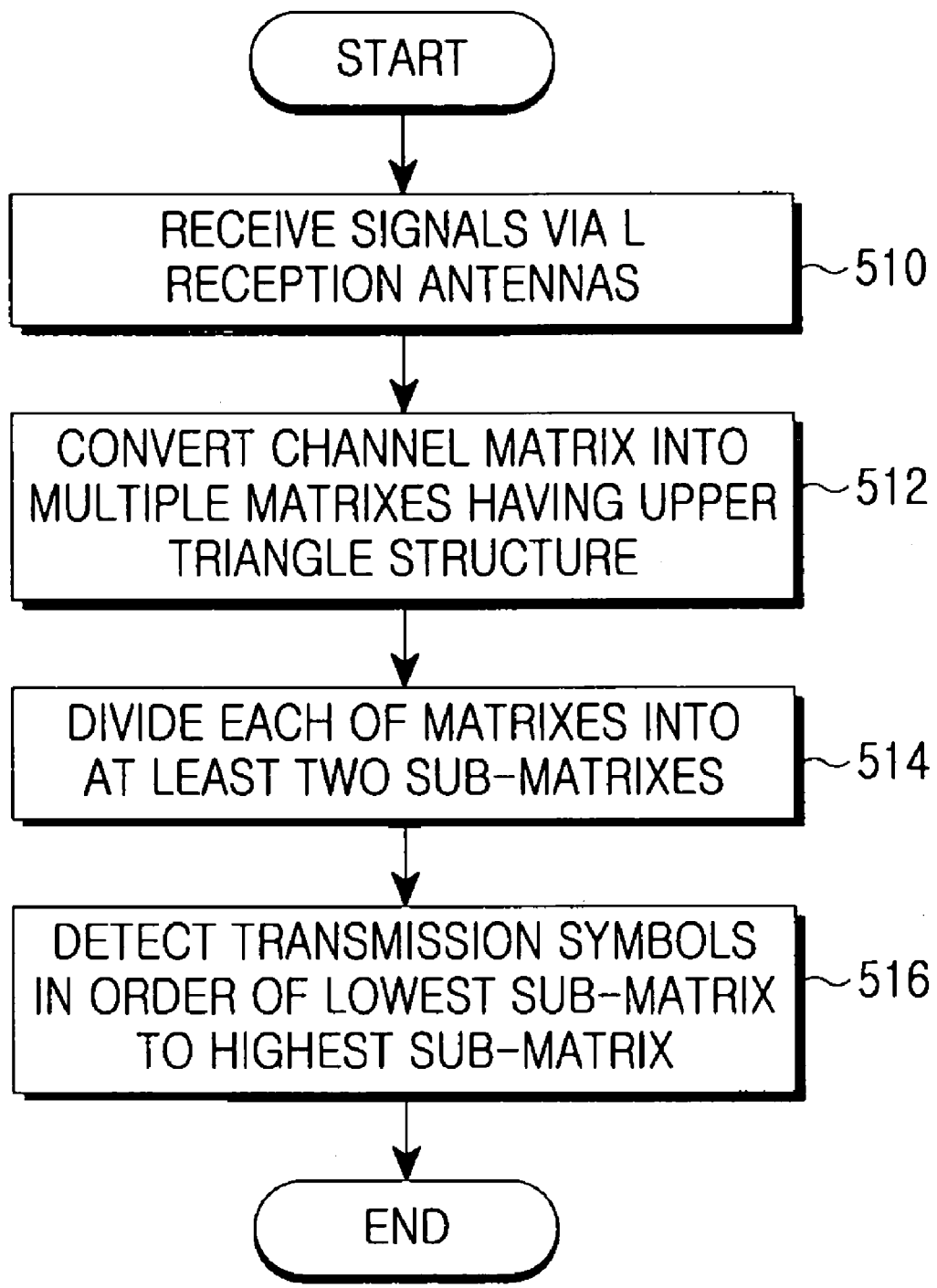
FIG. 2 is a flowchart illustrating a signal detection technique according to the present invention.

FIG. 2 is a flowchart illustrating a signal detection technique according to the present invention. It is assumed in FIG. 2 that the MIMO communication system includes a transmitter for transmitting signals via K transmission antennas, and a receiver for receiving the signals via L reception antennas (where $L \geq K$). Therefore, a channel matrix in the MIMO communication system is a K×L-dimensional matrix.

Referring to FIG. 2, in step 510, a decoder receives, via L reception antennas, signals transmitted via K transmission antennas of the transmitter. The received signals provided from the reception antennas can be expressed as Equation (1).

In step 512, the decoder converts a channel matrix of the received signals into a plurality of matrixes having an upper triangle structure. To this end, the decoder can use a QRP composition scheme. The received signals converted into the plurality of matrixes having the upper triangle structure can be expressed as Equation (8).

In step 514, the decoder divides each of the matrixes having the upper triangle structure into at least two sub-matrixes. Here, the sub-matrixes have a dimension lower than the dimension of the channel matrix. Equation (12) and Equation (13) show examples where the received signals are expressed by sub-matrixes.

In step 516, the decoder detects transmission symbols in order of the lowest sub-matrix to the highest sub-matrix. The lowest sub-matrix is a matrix composed of the components having only the channel characteristics for two transmission antennas. Herein, when detecting transmission symbols from the upper sub-matrix, the decoder considers the transmission symbols detected from its lower sub-matrix. The use of the MML technique can reduce the calculation for the detection of the transmission symbols.

After detecting transmission symbols for all sub-matrixes, the decoder outputs all of the detected transmission symbols.

As can be understood from the foregoing description, the signal detection method for a space multiplexing MIMO system according to the present invention minimizes the decoding complexity while maintaining the optimal decoding performance, which is an advantage of ML decoding, thereby improving the system performance.

In addition, the signal detection method for a space multiplexing MIMO system according to the present invention selects a lower system composed of some of the elements of a channel matrix in a system with a number of transmission/reception antennas, performs a decoding operation thereon, and detects all signals using the signal found from the lower system, thereby reducing the decoding complexity.

Further, the signal detection method for a space multiplexing MIMO system according to the present invention detects all signals using a plurality of lower system channel matrixes selected from the channel matrix of the entire system, thereby minimizing the decoding complexity while minimizing a diversity loss due to selection of the lower system.

While the invention has been shown and described with reference to a certain preferred embodiment thereof, it will be understood by those skilled in the art that various changes in form and details may be made therein without departing from the spirit and scope of the invention as further defined by the appended claims.

What is claimed is:

1. A method for detecting a signal in a receiver of a Multiple-Input Multiple-Output (MIMO) communication system including a transmitter for transmitting signals via K transmission antennas and a receiver for receiving the signals via L reception antennas, wherein L is greater than or equal to K and the system has a K×L-dimensional channel matrix, the method comprising the steps of:

converting the channel matrix into a plurality of matrixes having an upper triangle structure;

dividing each of the matrixes into at least two sub-matrixes having a dimension lower than that of the channel matrix;

detecting transmission symbols from corresponding transmission antennas by decoding a signal received according to a lowest sub-matrix having components with only the channel characteristics for two transmission antennas among the at least two sub-matrixes;

detecting transmission symbols from corresponding transmission antennas through decoding on a signal received according to an upper sub-matrix, using the transmission symbols; and outputting all of the detected transmission symbols, if transmission symbols by a highest sub-matrix among the at least two sub-matrixes are detected.

2. The method of claim 1, wherein the channel matrix and the matrixes having the upper triangle structure each are a 4×4-dimensional matrix, and the sub-matrix is a 2×2-dimensional matrix.

3. The method of claim 2, wherein a received signal $\tilde{y}$ by the matrices having the upper triangle structure is expressed as $\tilde{y}=\tilde{R}T^{-1}Px+\tilde{n}$, where $$\tilde{R} \text{ is } \begin{bmatrix} r_{11} & r_{12} & r_{13} & r_{14} & \cdots & r_{1K} \\ 0 & r_{22} & r_{23} & r_{24} & \cdots & r_{2K} \\ 0 & 0 & r_{33} & r_{34} & \cdots & r_{3K} \\ 0 & 0 & 0 & r_{44} & \cdots & r_{4K} \\ \vdots & & & & \ddots & \vdots \\ 0 & 0 & 0 & 0 & \cdots & r_{LK} \end{bmatrix} \text{ and}$$

$$T^1 \begin{bmatrix} t_{11} & t_{12} & t_{13} & t_{14} & \cdots & t_{1K} \\ 0 & t_{22} & t_{23} & t_{24} & \cdots & t_{2K} \\ 0 & 0 & t_{33} & t_{34} & \cdots & t_{3K} \\ 0 & 0 & 0 & t_{44} & \cdots & t_{4K} \\ \vdots & & & & \ddots & \vdots \\ 0 & 0 & 0 & 0 & \cdots & t_{LK} \end{bmatrix},$$

where P denotes a permutation matrix, $T^{-1}$ denotes a inverse matrix of a previously known unimodular matrix T, the $\tilde{R}$ matrix is equal to RT, R is equal to $Q^{-1}HP^{-1}$, H denotes a channel transfer matrix, x is a transmission signal matrix such that $x=[x_1, x_2, \ldots, x_k]$, $\tilde{n}$ is equal to $Q^Hn$, where $Q^H$ is a hermitian matrix of Q and $n=[n_1, n_2, \ldots, n_L]$ is an additive white Gaussian noise (AWGN)

matrix input to each reception antenna, and where r is an element of the $\tilde{R}$ matrix, and t is an element of $T^{-1}$.

4. The method of claim 3, wherein a received signal by the lowest sub-matrix is $$\begin{bmatrix} y_3 \\ y_4 \end{bmatrix} = \begin{bmatrix} r_{33} & r_{34} \\ 0 & r_{44} \end{bmatrix} \begin{bmatrix} t_{33} & t_{34} \\ 0 & t_{44} \end{bmatrix} \begin{bmatrix} x_3 \\ x_4 \end{bmatrix} + \text{noise, where} \begin{bmatrix} r_{33} & r_{34} \\ 0 & r_{44} \end{bmatrix}$$

is a lowest sub-matrix of $\tilde{R}$ and $$\begin{bmatrix} t_{33} & t_{34} \\ 0 & t_{44} \end{bmatrix}$$

is a lowest sub-matrix of $T^{-1}$.

5. The method of claim 4, wherein a received signal by the highest sub-matrix is $$\begin{bmatrix} y_1 \\ y_2 \end{bmatrix} = \begin{bmatrix} r_{11} & r_{12} \\ 0 & r_{22} \end{bmatrix} \begin{bmatrix} t_{11} & t_{12} \\ 0 & t_{22} \end{bmatrix} \begin{bmatrix} x_1 \\ x_2 \end{bmatrix} + I(x_3, x_4) + \text{noise},$$

where $I(x_3,x_4)$ is a term $$\begin{bmatrix} r_{11} & r_{12} & r_{13} & r_{14} \\ 0 & r_{22} & r_{23} & r_{24} \end{bmatrix} \begin{bmatrix} t_{13} & t_{14} \\ t_{23} & t_{24} \\ t_{33} & t_{34} \\ 0 & t_{44} \end{bmatrix} \begin{bmatrix} x_3 \\ x_4 \end{bmatrix}$$

by previously detected transmission symbols.

6. The method of claim 4, wherein the detection of the transmission symbols is achieved by a Modified Maximum Likelihood detection (MML) technique.

7. The method of claim 5, wherein the detection of the transmission symbols is achieved by a Modified Maximum Likelihood detection (MML) technique.

8. An apparatus for detecting a signal in a receiver of a Multiple-Input Multiple-Output (MIMO) communication system having a K×L-dimensional channel matrix, the apparatus comprising:

L reception antennas for receiving signals transmitted from a transmitter via K transmission antennas; and a decoder for detecting transmission symbols from the received signals provided from the reception antennas and converting the channel matrix into a plurality of matrixes having an upper triangle structure, dividing each of the matrixes into at least two sub-matrixes having a dimension lower than that of the channel matrix, detecting transmission symbols from corresponding transmission antennas by decoding a signal received according to a lowest sub-matrix having components with only the channel characteristics for two transmission antennas among the at least two sub-matrixes, detecting transmission symbols from corresponding transmission antennas through decoding on a signal received according to an upper sub-matrix, using the transmission symbols; and outputting all of the detected transmission symbols, if transmission symbols by a highest sub-matrix among the at least two sub-matrixes are detected.

9. The apparatus of claim 8, wherein the channel matrix and the matrixes having the upper triangle structure each are a 4×4-dimensional matrix, and the sub-matrix is a 2×2-dimensional matrix.

10. The apparatus of claim 9, wherein a received signal $\tilde{y}$ by the matrixes having the upper triangle structure is expressed as $\tilde{y}=\tilde{R}T^{-1}Px+\tilde{n}$, where $$\tilde{R} \text{ is } \begin{bmatrix} r_{11} & r_{12} & r_{13} & r_{14} & \cdots & r_{1K} \\ 0 & r_{22} & r_{23} & r_{24} & \cdots & r_{2K} \\ 0 & 0 & r_{33} & r_{34} & \cdots & r_{3K} \\ 0 & 0 & 0 & r_{44} & \cdots & r_{4K} \\ \vdots & & & & \ddots & \vdots \\ 0 & 0 & 0 & 0 & \cdots & r_{LK} \end{bmatrix} \text{ and}$$

$$T^{1} \text{ is } \begin{bmatrix} t_{11} & t_{12} & t_{13} & t_{14} & \cdots & t_{1K} \\ 0 & t_{22} & t_{23} & t_{24} & \cdots & t_{2K} \\ 0 & 0 & t_{33} & t_{34} & \cdots & t_{3K} \\ 0 & 0 & 0 & t_{44} & \cdots & t_{4K} \\ \vdots & & & & \ddots & \vdots \\ 0 & 0 & 0 & 0 & \cdots & t_{LK} \end{bmatrix},$$

where P denotes a permutation matrix, $T^{-1}$ denotes a inverse matrix of a previously known unimodular matrix T, the $\tilde{R}$ matrix is equal to RT, R is equal to $Q^{-1} H P^{-1}$, H denotes a channel transfer matrix, x is a transmission signal matrix such that $x=[x_1, x_2, \ldots, x_k]$, $\tilde{n}$ is equal to $Q^H n$, where $Q^H$ is a hermitian matrix of Q and $n=[n_1, n_2, \ldots, n_L]$ is an additive white Gaussian noise (AWGN) matrix input to each reception antenna, and where r is an element of the $\tilde{R}$ matrix, and t is an element of $T^{-1}$.

11. The apparatus of claim 10 wherein a received signal by the lowest sub-matrix is $$\begin{bmatrix} y_3 \\ y_4 \end{bmatrix} = \begin{bmatrix} r_{33} & r_{34} \\ 0 & r_{44} \end{bmatrix} \begin{bmatrix} t_{33} & t_{34} \\ 0 & t_{44} \end{bmatrix} \begin{bmatrix} x_3 \\ x_4 \end{bmatrix} + \text{noise},$$

where $$\begin{bmatrix} r_{33} & r_{34} \\ 0 & r_{44} \end{bmatrix}$$

is a lowest sub-matrix of $\tilde{R}$ and $$\begin{bmatrix} t_{33} & t_{34} \\ 0 & t_{44} \end{bmatrix}$$

is a lowest sub-matrix of $T^{-1}$.

12. The apparatus of claim 11, wherein a received signal by the highest sub-matrix is $$\begin{bmatrix} y_1 \\ y_2 \end{bmatrix} = \begin{bmatrix} r_{11} & r_{12} \\ 0 & r_{22} \end{bmatrix} \begin{bmatrix} t_{11} & t_{12} \\ 0 & t_{22} \end{bmatrix} \begin{bmatrix} x_1 \\ x_2 \end{bmatrix} + I(x_3, x_4) + \text{noise},$$

where $I(x_3, x_4)$ is a term $$\begin{bmatrix} r_{11} & r_{12} & r_{13} & r_{14} \\ 0 & r_{22} & r_{23} & r_{24} \end{bmatrix} \begin{bmatrix} t_{13} & t_{14} \\ t_{23} & t_{24} \\ t_{33} & t_{34} \\ 0 & t_{44} \end{bmatrix} \begin{bmatrix} x_3 \\ x_4 \end{bmatrix}$$

by previously detected transmission symbols.

13. The apparatus of claim 11, wherein the detection of the transmission symbols is achieved by a Modified Maximum Likelihood detection (MML) technique.

14. The apparatus claim 12, wherein the detection of the transmission symbols is achieved by a Modified Maximum Likelihood detection (MML) technique.

* * * * *